United States Patent [19]

Hurwitz

[11] Patent Number: 4,487,995

[45] Date of Patent: Dec. 11, 1984

[54] ANCHORING BRAIDED METAL SHEATH ON IGNITION WIRE

[75] Inventor: Scott L. Hurwitz, Fairport, N.Y.

[73] Assignee: Magnum Shielding Corp., Pittsford, N.Y.

[21] Appl. No.: 529,602

[22] Filed: Sep. 6, 1983

Related U.S. Application Data

[63] Continuation-in-part of Ser. No. 459,054, Jan. 19, 1983.

[51] Int. Cl.[3] .......... H02G 15/02

[52] U.S. Cl. .......... 174/74 R; 29/862; 174/77 S; 174/84 C; 174/35 SM; 339/223 S

[58] Field of Search .......... 174/74 R, 75 C, 77 S, 174/84 C, 35 SM, 35 C; 29/862; 339/223 R, 223 S, 143 S

[56] References Cited

U.S. PATENT DOCUMENTS

| | | | |
|---|---|---|---|
| 1,661,102 | 2/1928 | Waite | 174/74 R |
| 1,748,765 | 2/1930 | Hellermann | 174/74 R |
| 1,786,585 | 12/1930 | Walker | 174/82 |
| 2,522,169 | 9/1950 | Frei | 174/35 SM |
| 2,786,095 | 3/1957 | Arbeiter | 339/223 R |
| 2,901,528 | 8/1959 | Lazar | 339/223 |
| 3,146,519 | 9/1964 | Redwine | 174/84 C |
| 3,546,365 | 12/1970 | Collier | 174/75 C X |

FOREIGN PATENT DOCUMENTS

| | | | |
|---|---|---|---|
| 836729 | 1/1939 | France | 174/74 R |
| 1084946 | 1/1955 | France | 174/74 R |
| 404582 | 7/1943 | Italy | 174/35 C |
| 158796 | 2/1921 | United Kingdom | 174/74 R |
| 865513 | 4/1961 | United Kingdom | 174/74 R |

*Primary Examiner*—A. C. Prescott
*Assistant Examiner*—Morris H. Nimmo
*Attorney, Agent, or Firm*—Stonebraker, Shepard & Stephens

[57] ABSTRACT

A braided metal sheath 11 is anchored on an ignition wire 10 to protectively encase wire 10 and leave the sheath ends 14 spaced at an electrically insulating distance from terminal end regions 9 of wire 10 to prevent shorting out the ignition wire. The anchorage can be made by sliding a shorter length of a separate sheath onto a longer length of ignition wire 10, winding a wrapper 13 over each of the sheath ends 14, and then clamping with a radially compressible clamp that fits over and conceals wrapper 13. The sheathing can also be braided directly onto a continuous length of ignition wire 10 that is cut to individual wire lengths. Then end regions of the sheathing are cut and stripped from the ignition wire to leave sheath ends 14 at an electrically insulating distance from terminal ends 9 of wire 10. Sheath ends 14 are then clamped to wire 10 to conceal the sheath ends and prevent fraying.

8 Claims, 2 Drawing Figures

ANCHORING BRAIDED METAL SHEATH ON IGNITION WIRE

RELATED APPLICATIONS

This application is a continuation-in-part of my copending companion application Ser. No. 459,054, filed Jan. 19, 1983, entitled SHEATHING SYSTEM FOR AUTOMOTIVE OR MARINE IGNITION WIRES, the disclosure of which is hereby incorporated into this continuation-in-part application.

BACKGROUND

I have discovered and disclosed in my parent application a simple and inexpensive way of applying and grounding braided metallic sheaths for automotive or marine ignition wires. These protect the wires from damage, double their heat resistance, greatly improve their appearance, and ensure suppression of electrical activity and elimination of radio and instrument interference.

My system of sheathing ignition wires grounds mid-regions of the sheaths and keeps the sheath ends at electrically insulating distances from terminal end regions of the wires. This ensures that the sheath does not short out the wire. I have also found effective yet economical ways of anchoring the sheathing securely on the ignition wires and neatly terminating the sheath ends.

SUMMARY OF THE INVENTION

I anchor a braided metal sheath on an ignition wire so that ends of the sheath are spaced at an electrically insulating distance from terminal end regions of the wire. For separately made sheaths, I slide a shorter length of sheath over a longer length of ignition wire and wind a wrapper over each end of the sheath to hold its ends against the ignition wire. Then I arrange a clamp over each of the wrapped ends of the sheath so that the clamps overlap and conceal the wrapped ends, and I compress the clamps radially inward against the sheath to hold the clamps and the sheath securely in place on the ignition wire. For sheaths braided directly onto a continuous length of ignition wire, I cut sheathed ignition wire into suitable lengths and cut away end regions of the sheath so that the sheath ends terminate at an electrically insulating distance from respective terminal end regions of the ignition wire. I then arrange and compress clamps over the sheath ends.

DRAWINGS

FIGS. 1 and 2 schematically show preferred steps in two preferred methods of anchoring a braided metal sheath on an ignition wire with each step accompanied by partially schematic views of the anchorage that develops as the method proceeds; and FIGS. 3A and 3B are perspective views of an alternative form of clamp with a hinge and locking pin for use in clamping sheath ends.

DETAILED DESCRIPTION

Figure 1:
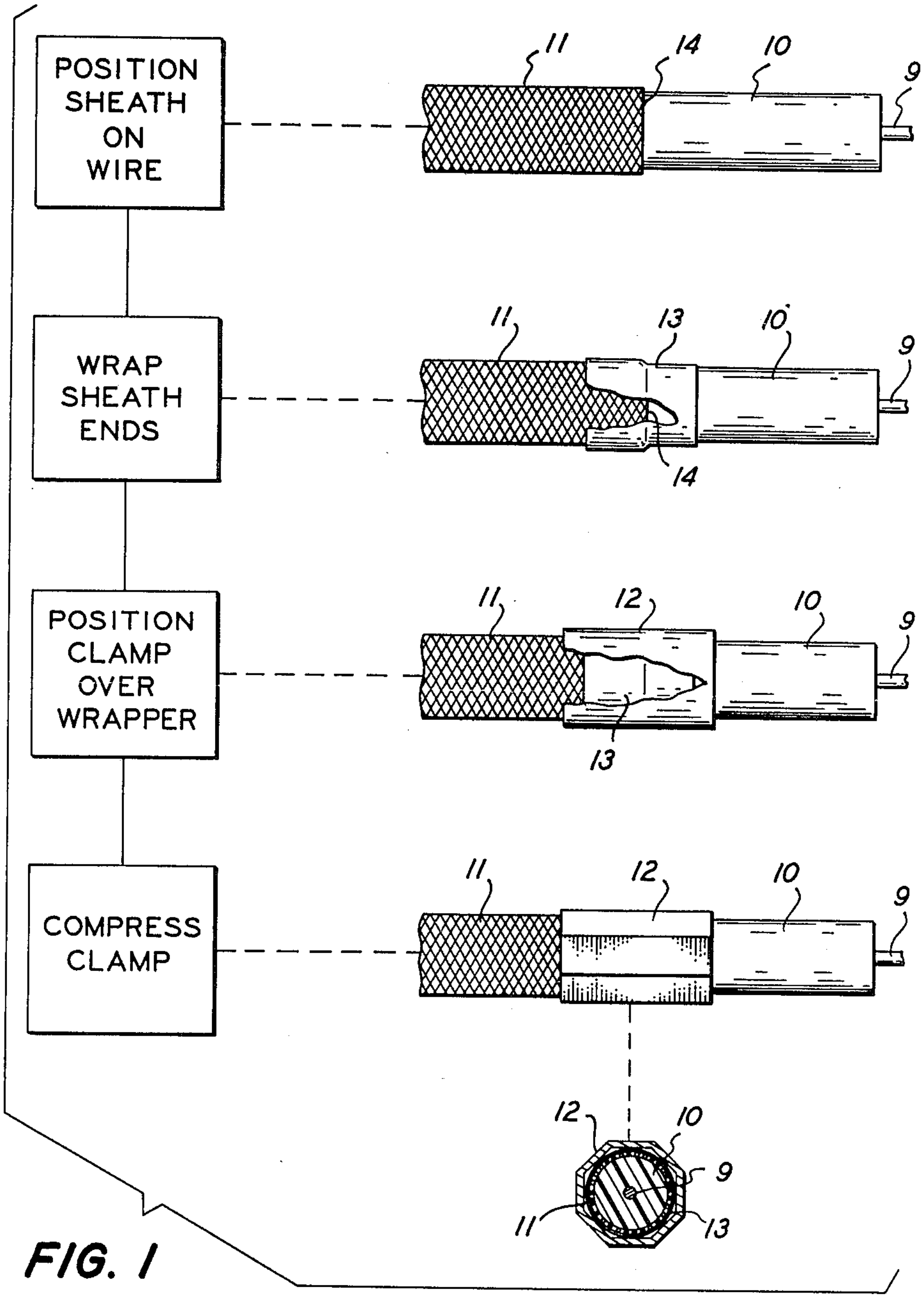

As explained in my parent application, I sheathe generally known ignition wire 10 with shiny braided metallic sheath 11 that improves the appearance, protects the wire from heat and mechanical damage, and suppresses electrical interference. Instead of expensive end terminations for grounding sheath 11, I ground the mid-regions and terminate the ends of sheath 11 at an electrically insulating distance from terminal end regions 9 of wire 10 so that the sheath does not short out the ignition wire. Termination fittings for ends 9 of wire 10 are then added in a generally known way after encasing wire 10 in sheath 11.

There are two basic ways of arranging sheathing over a mid-region of an ignition wire. One is a separately formed sheath with a large enough inside diameter so it can be slid axially onto the ignition wire. For this method, a length of sheath 11 is cut to a shorter length than ignition wire 10 and is slid onto ignition wire 10 so that the sheath ends 14 are spaced from terminal ends 9 of wire 10 by an electrically insulating distance. A preferred way of anchoring such a sheath is shown in FIG. 1.

Figure 2:
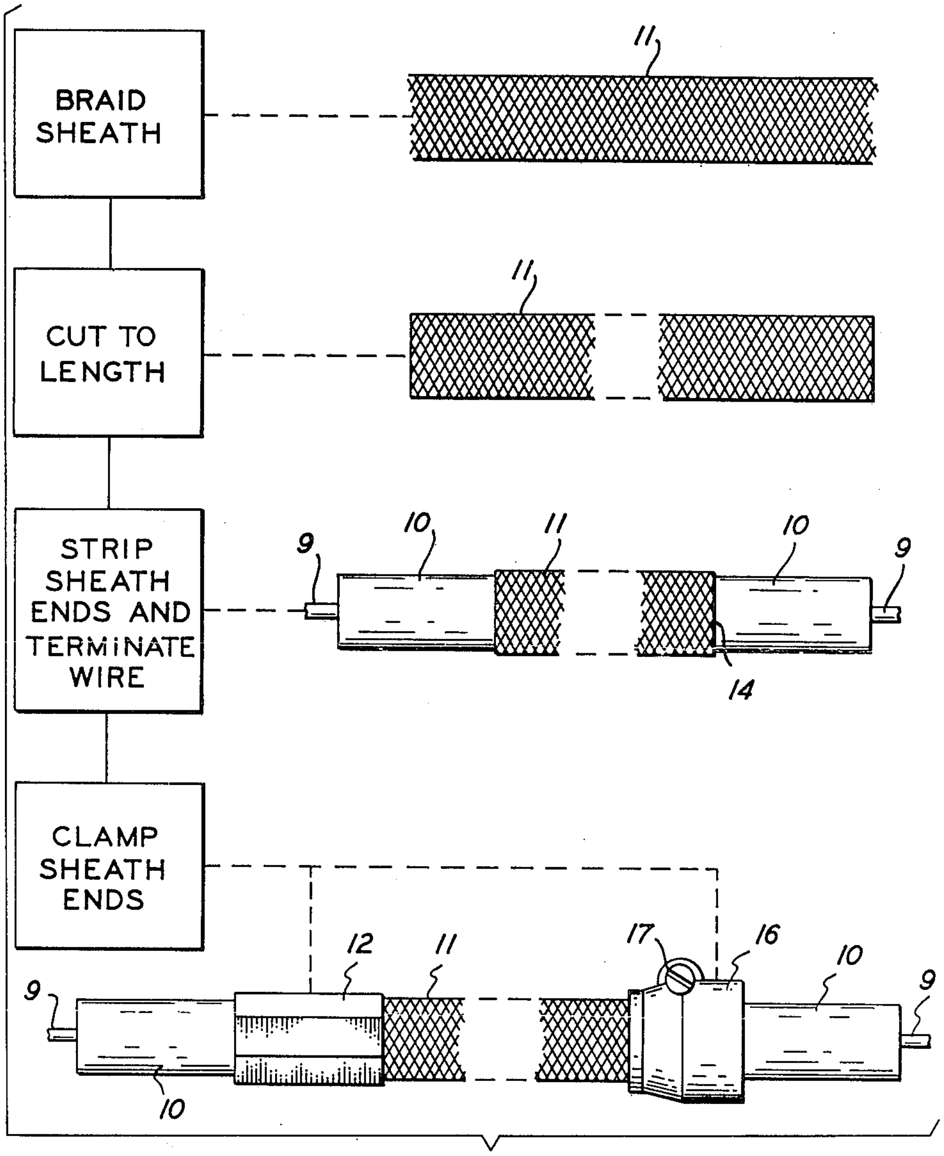

The other way of applying sheathing to a mid-region of an ignition wire is to braid sheathing onto a continuous length of ignition wire, cut the sheathed wire to lengths suitable for individual ignition wires, and then trim and strip the sheath 11 so that sheath ends 14 are spaced from terminal ends 9 of ignition wire 10 by an electrically insulating distance. A preferred way of anchoring such braided-on sheathing is shown in FIG. 2.

By either the slid-on or the braided-on method, sheathing 11 must be anhored in place on wires 10, and sheath ends 14 must be encased so that individual sheath wires do not fray and loosen at sheath ends 14. To meet these requirements, I prefer clamps arranged over sheath ends 14 to conceal, trim, and anchor sheath ends 14 on wires 10. The clamps are also positioned to be spaced by an electrically insulating distance from terminal ends 9 of wires 10.

For the slide-on sheath method as shown in FIG. 1, I cut a suitable length of sheath 11 in a size that slides freely but snuggly over ignition wire 10, and I slide sheath 11 onto a central position on wire 10 so that sheath ends 14 are spaced by an electrically insulating distance of about one inch from terminal ends 9 of wire 10.

Then I wind a wrapper 13 over each end 14 of sheath 11. I prefer masking tape for wrapper 13, and I have found it best to wrap a $\frac{1}{2}$ inch (12.5 mm) wide piece of masking tape to overlap each end 14 of sheath 11 so that more than half of the tape adheres to sheath 11 and less than half of the tape extends beyond sheath end 14 and adheres to wire 10. A quarter to a third of tape 13 adhering to wire 10 prevents any accidental sheath movement during the rest of the anchoring process, and $\frac{2}{3}$rds to $\frac{3}{4}$ths of tape 13 wrapped around the outside of sheath end 14 forms a high friction interface between sheath 11 and a surrounding clamp 12 to increase the interlock in the finished anchorage.

For clamp 12, I prefer a sleeve ferrule that can be radially compressed by being crimped into a polygonal or other non-cylindrical shape. Other radially compressible clamps that are satisfactory include sleeves containing devices such as tubing clamps that can be tightened radially inward. I prefer that any clamp used should enclose and conceal sheath ends 14 for a neatly trimmed appearance.

With tapes 13 in place, I slide a sleeve ferrule 12 or other clamp over each tape 13. Sleeve ferrules 12 are generally cylindrical and preferably formed of shiny metal such as stainless steel, anodized aluminum, or plated metal to retain a gleaming metallic appearance. Sleeves 12 have an inside diameter slightly larger than the outside diameter of tapes 13 so they can just slide easily over tapes 13. Sleeve ferrules 12 are preferably ⅝ths inch (15.6 mm) in axial length so they can be centered over and fully conceal tapes 13.

Once ferrules 12 are properly positioned, I crimp them into a non-cylindrical or polygonal shape—preferably octagonal. This effectively reduces the inside diameter of ferrules 12 and squeezes their inside surfaces against tape 13, sheath 11, and wire 10. The result is a surprisingly firm anchorage that cannot be dislodged without considerable force.

Sheaths 11 and sleeves 12 are available in many diameters to fit many diameters of ignition wires. Typical dimensions for high quality automotive ignition wires are a diameter of 0.320 inch (8.0 mm) for wire 10 and outside diameter of 0.335 inch (8.4 mm) for sheath 11 encasing wire 10, an outside diameter of 0.345 inch (8.6 mm) for tape 13 wrapped around ends 14 of sheath 11, and an inside diameter of 0.350 inch (8.8 mm) for sleeve ferrule 12.

After the anchorages secure sheath 11 on wires 10, terminal ends 9 are given generally known terminal connectors and protective insulating boots suitable for connection to a spark plug at one end and a distributor cap at another end. The sheaths are also grounded as explained in my parent application. The results, although inexpensive, are a sturdy and attractive set of ignition wires that are well protected and reliably suppress electrical interference.

For the braided-on sheath method shown in FIG. 2, I braid sheathing 11 over a continuous length of ignition wire 10 and then cut the braided wire to lengths suitable for individual ignition wires. Then I cut and strip away the end region of each sheath to leave its ends 14 spaced by an electrically insulating distance from terminal ends 9 of wire 10. Scissor cutting is satisfactory for this.

Figure 3A:
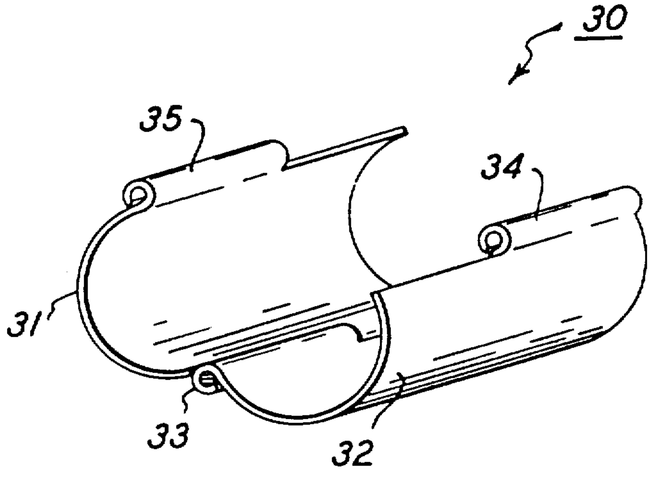
Figure 3B:
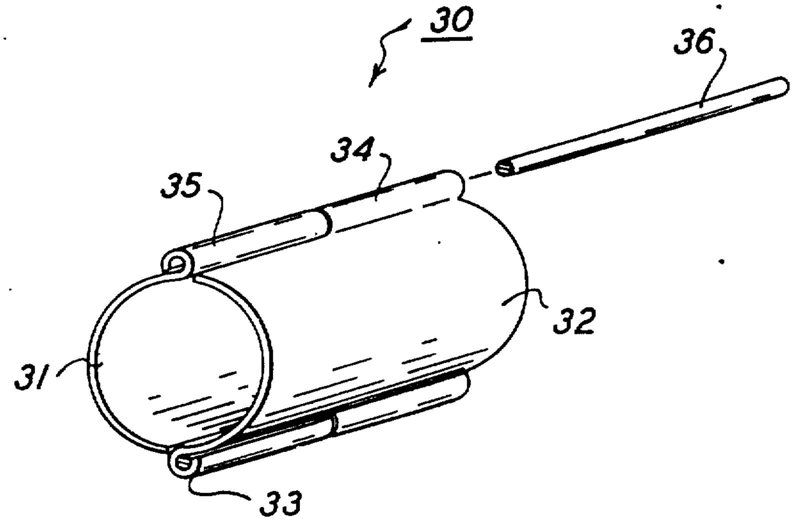

Then I clamp sheath ends 14 with a clamp that includes a concealing sleeve. The clamp anchors the sheath, keeps sheath ends 14 from fraying, and also gives a neatly trimmed appearance. Several different clamps can be used such as sleeve ferrule 12 as previously explained or sleeved tubing clamp 16 having a tightening screw 17. Another clamp possibility as shown in FIGS. 3A and 3B is a clamp 30 having two semi-cylindrical halves 31 and 32 connected by hinge 33 and having rolled tubes 34 and 35 on an opposite side. When clamp 30 is compressed radially onto a sheath end 14, it squeezes closed to anchor the sheath in place and is held by a pin 36 pressed through tubes 34 and 35.

Whatever clamps are used are also positioned at an electrically insulating distance from terminal ends 9 of wire 10. Sheath ends 14 can also be wound with a wrapper 13 before being clamped, and a wrapper can help slide clamps over sheath ends 14, which are otherwise likely to fray.

I claim:

1. A method of anchoring a braided metal sheath on a smooth cylindrical outer surface of an ignition wire so that said sheath does not move axially of said ignition wire and does not short out said ignition wire, said method comprising:

a. sliding a length of said sheath over said smooth cylindrical outer surface of a longer length of said ignition wire and positioning said sheath so each end of said sheath is spaced at an electrically insulating distance from a respective terminal end region of said wire;

b. winding a wrapper of a thin flat adhesive tape over each end of said sheath so that each tape wrapper overlaps an end region of said sheath and said smooth outer surface of said ignition wire adjacent said end region of said sheath and holds wire ends of said sheath against said ignition wire;

c. arranging a ferrule over each of said wrapped ends of said sheath so that said ferrules overlie and conceal said tape wrappers and said ends of said sheath; and d. compressing said ferrules radially inward against said tape wrappers, said sheath, and said ignition wire so that holding pressure from each of said compressed ferrules presses an inner surface of said tape wrapper tightly against said end region of said sheath and said smooth surface of said ignition wire adjacent said end region of said sheath and presses an inner surface of said ferrule tightly against an outer surface of said tape wrapper to hold said ferrules and said sheath securely in place on said ignition wire at said electrically insulating distance from said terminal end regions of said wire.

2. The method of claim 1 including using cylindrical sleeves for said ferrules and compressing said sleeves by crimping.

3. The method of claim 2 including crimping said sleeves into non-cylindrical shapes.

4. A method of anchoring a braided metal sheath on a smooth cylindrical outer surface of an ignition wire so that said sheath does not move axially of said ignition wire and does not short out said ignition wire, said method comprising:

a. braiding said sheath onto a continuous length of said ignition wire;

b. cutting sheathed ignition wire to suitable lengths for individual ignition wires;

c. cutting away end waste from said sheath so that ends of said sheath remaining on said ignition wire terminate at an electrically insulating distance from respective terminal end regions of said ignition wire;

d. winding a wrapper of a thin flat adhesive tape over each end of said sheath so that each tape wrapper overlaps an end region of said sheath and holds wire ends of said sheath against said ignition wire;

e. arranging a ferrule over each of said wrapped ends of said sheath so that said ferrules overlie and conceal said tape wrappers and said ends of said sheath; and f. compressing said ferrules radially inward against said tape wrappers, said sheath, and said ignition wire so that holding pressure from each of said compressed ferrules presses an inner surface of said tape wrapper tightly against said end region of said sheath and presses an inner surface of said ferrule tightly against an outer surface of said tape wrapper to hold said ferrules and said sheath securely in place on said ignition wire at said electrically insulating distance from said terminal end regions of said wire.

5. The method of claim 4 including using cylindrical sleeves for said ferrules, and radially compressing said sleeves by crimping.

6. The method of claim 5 including crimping said sleeves into non-cylindrical shapes.

7. An ignition wire sheathing system for holding a braided metal sheath on a smooth cylindrical outer surface of an ignition wire so that said sheath does not move axially of said ignition wire and does not short out said ignition wire, said system comprising:

a. said sheath being arranged over said smooth cylindrical outer surface of said ignition wire so that each end of said sheath is spaced at an electrically insulating distance from a respective terminal end region of said wire;
b. a wrapper of thin flat adhesive tape wound over each end of said sheath so that each tape wrapper overlaps an end region of said sheath and holds the ends of said sheath against said ignition wire;
c. a ferrule arranged over each of said wrapped ends of said sheath so that said ferrules overlie and conceal said tape wrappers and said ends of said sheath; and
d. said ferrules being radially compressed so that each of said ferrules presses an inner surface of said tape wrapper tightly against said end region of said sheath and presses an inner surface of said ferrule tightly against an outer surface of said tape wrapper to hold said ferrules and said sheath securely in place on said ignition wire at said electrically insulating distance from said terminal end regions of said ignition wire.

8. The system of claim 7 wherein each of said ferrules is a cylindrical sleeve crimped into a non-cylindrical shape.

* * * * *

UNITED STATES PATENT AND TRADEMARK OFFICE

CERTIFICATE OF CORRECTION

PATENT NO. : 4,487,995

DATED : December 11, 1984

INVENTOR(S) : Scott L. Hurwitz

It is certified that error appears in the above-identified patent and that said Letters Patent is hereby corrected as shown below:

Title page, second column, below the ABSTRACT, the statement of "8 claims, 2 Drawing Figures" should read "8 claims, 4 Drawing Figures".

A third sheet of drawings containing Figures 3A and 3B should be added as per the attached sheet.

Signed and Sealed this

*Sixteenth* Day of *April 1985*

[SEAL]

*Attest:*

DONALD J. QUIGG

*Attesting Officer* *Acting Commissioner of Patents and Trademarks*